(12) United States Patent
Kodama

(10) Patent No.: US 7,165,160 B2
(45) Date of Patent: Jan. 16, 2007

(54) COMPUTING SYSTEM WITH MEMORY MIRRORING AND SNAPSHOT RELIABILITY

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 10/939,917

(22) Filed: Sep. 8, 2004

(65) Prior Publication Data

US 2006/0053260 A1    Mar. 9, 2006

(51) Int. Cl.
G06F 12/00    (2006.01)

(52) U.S. Cl. ............... 711/169; 711/162; 711/165; 711/203

(58) Field of Classification Search .......... None
See application file for complete search history.

(56) References Cited

U.S. PATENT DOCUMENTS

| | | | |
|---|---|---|---|
| 6,263,452 B1 * | 7/2001 | Jewett et al. | 714/9 |
| 6,282,610 B1 * | 8/2001 | Bergsten | 711/114 |
| 6,356,991 B1 * | 3/2002 | Bauman et al. | 711/209 |
| 6,434,681 B1 * | 8/2002 | Armangau | 711/162 |
| 6,473,847 B1 * | 10/2002 | Kamiya | 711/171 |
| 6,487,561 B1 * | 11/2002 | Ofek et al. | 707/204 |
| 6,662,289 B1 * | 12/2003 | Ang | 711/202 |
| 6,766,429 B1 | 7/2004 | Bland et al. | |
| 2003/0140210 A1 * | 7/2003 | Testardi | 711/203 |
| 2003/0200405 A1 * | 10/2003 | Willman et al. | 711/163 |
| 2004/0090827 A1 * | 5/2004 | Dahlen et al. | 365/200 |
| 2004/0128269 A1 * | 7/2004 | Milligan et al. | 707/1 |
| 2004/0143639 A1 * | 7/2004 | Rangan et al. | 709/212 |
| 2004/0172508 A1 | 9/2004 | Nguyen et al. | |
| 2004/0230767 A1 | 11/2004 | Bland et al. | |
| 2004/0254964 A1 * | 12/2004 | Kodama et al. | 707/204 |
| 2005/0091461 A1 | 4/2005 | Kisley et al. | |

OTHER PUBLICATIONS

R.B. Tremaine, et al., "IBM Memory Expansion Technology (MXT)", Mar. 2003, vol. 45, No. 2, IBM J. Res. & Dev.
VMware, Inc., "VMware Wrokstation 4.5, Using Suspend and Resume", 2004, 2 pages.
VMware, Inc., "WMware Wrokstation 4.5, Using the Snapshot", 2004, 5 pages.
Network Appliance, Inc., "File System Design for an NFS Server Appliance", 2004, 11 pages.

* cited by examiner

*Primary Examiner*—Reginald Bragdon
*Assistant Examiner*—Horace L. Flournoy
(74) *Attorney, Agent, or Firm*—Townsend and Townsend and Crew LLP (57) ABSTRACT

A computing system is provided with enhanced data reliability by implementing mirroring and snapshot functionality of the system memory. In the computing system, a processor executes its programs from a first region of a physical memory. Using instructions from the system itself, or from an external console, the first region of the physical memory is periodically mirrored to a second region of the physical memory not used by the processor. This second region can be volatile or nonvolatile memory. The computing system also includes snapshot functionality by which images of the second region of the physical memory are taken at periodic intervals and stored to enable returning the system to a previous state when desired, or in the event of failure.

23 Claims, 13 Drawing Sheets

COMPUTING SYSTEM WITH MEMORY MIRRORING AND SNAPSHOT RELIABILITY

BACKGROUND OF THE INVENTION

Large organizations throughout the world now are involved in billions of transactions which include enormous amounts of text, video, graphical and other information which is being categorized, stored, accessed, processed and transferred every day. The volume of such information is continuing to grow, and a variety of techniques for managing that information have been developed. One technique for managing such massive amounts of information is the use of storage systems. Conventional storage systems include large numbers of disk drives operating under various control mechanisms to record, backup and enable reproduction of this enormous amount of data.

While these storage systems provide extraordinarily high reliability for preserving the data once a computer system has processed it, they do not provide any redundancy, security or reliability for the data before it has been stored in the storage system. With today's large computing systems, an enormous amount of data, including instructions and other information may be present in the computer system at a given instant. This data can easily be damaged by viruses, hackers, mistakes made by users, power failures, and the like. While this data is stored in the computer memory, applications operating on the computer system are creating, changing, and reading it. At the present time there is no efficient way to protect the data in the computer memory. Some particularly robust computing environments, for example those manufactured formerly by Tandem Computers, provided increased reliability. Also, many computing systems, for example servers, have redundancy for the data words stored in the memory, but this redundancy is intended to protect the data from bit errors, typically by use of error correction codes. Loss of entire words, or larger amounts of data, is not protected until data processing is completed.

Accordingly, what is needed is a system for protecting the data in the computer system before it is stored in the storage system.

BRIEF SUMMARY OF THE INVENTION

This invention relates to a system by which the memory of a computer system may be protected by the creation and saving of extra copies of the data as it is being manipulated by the computer system. The invention provides a technique for "mirroring" data in the computer memory as it is being processed, and for periodically taking "snapshots" of the data stored in the memory, and saving those snapshots. In this manner, the user data, intermediate results, or other important information temporarily resident in the computing system memory, can be protected and restored in case of failure.

In the mirroring process, a backup copy of the memory is continuously updated as new information is stored in the memory being backed up. This is preferably achieved using a queue which assures that as data is written to the memory, it is copied to a separate region of the memory asynchronously. In this manner an "extra" copy of the memory at a very recent time is essentially always available. Furthermore, periodic copies, referred to herein as "snapshots," of the mirrored data can be made. In this manner the state of the machine and all of its intermediate results are available. This allows the user to restore the machine to an earlier state.

In a preferred embodiment, a computer system according to this invention includes a processor, a memory controller coupled to the processor, and a physical memory coupled to the memory controller. The physical memory includes a first region for use by the processor in executing instructions and storing data, and also includes a second region. As the system is processing data, whenever writes are performed to the first region of the memory, they are also queued and written to the second region as soon as possible. Herein this process is referred to as "mirroring." Thus, should a failure occur to the first region, once the queued writes are completed, the second region can be used in lieu of the first region. In addition, a copy of the second region can be made to a third region thereby providing a record of the state of the memory at earlier times in processing of the computer system. This process is referred to as taking a "snapshot."

The system also provides a method of improving reliability of a computer system having a processor, a memory controller coupled to the processor and a physical memory coupled to the memory controller. The method includes the steps of using a first region of the physical memory for processor operations, continuously copying the first region to a second region, and continuing processor operations using the first region. In addition, if it is desired to be able to revert to an earlier state of the computing system, the method further includes a steep of copying the second region to a third region.

DETAILED DESCRIPTION OF THE INVENTION

Figure 1:
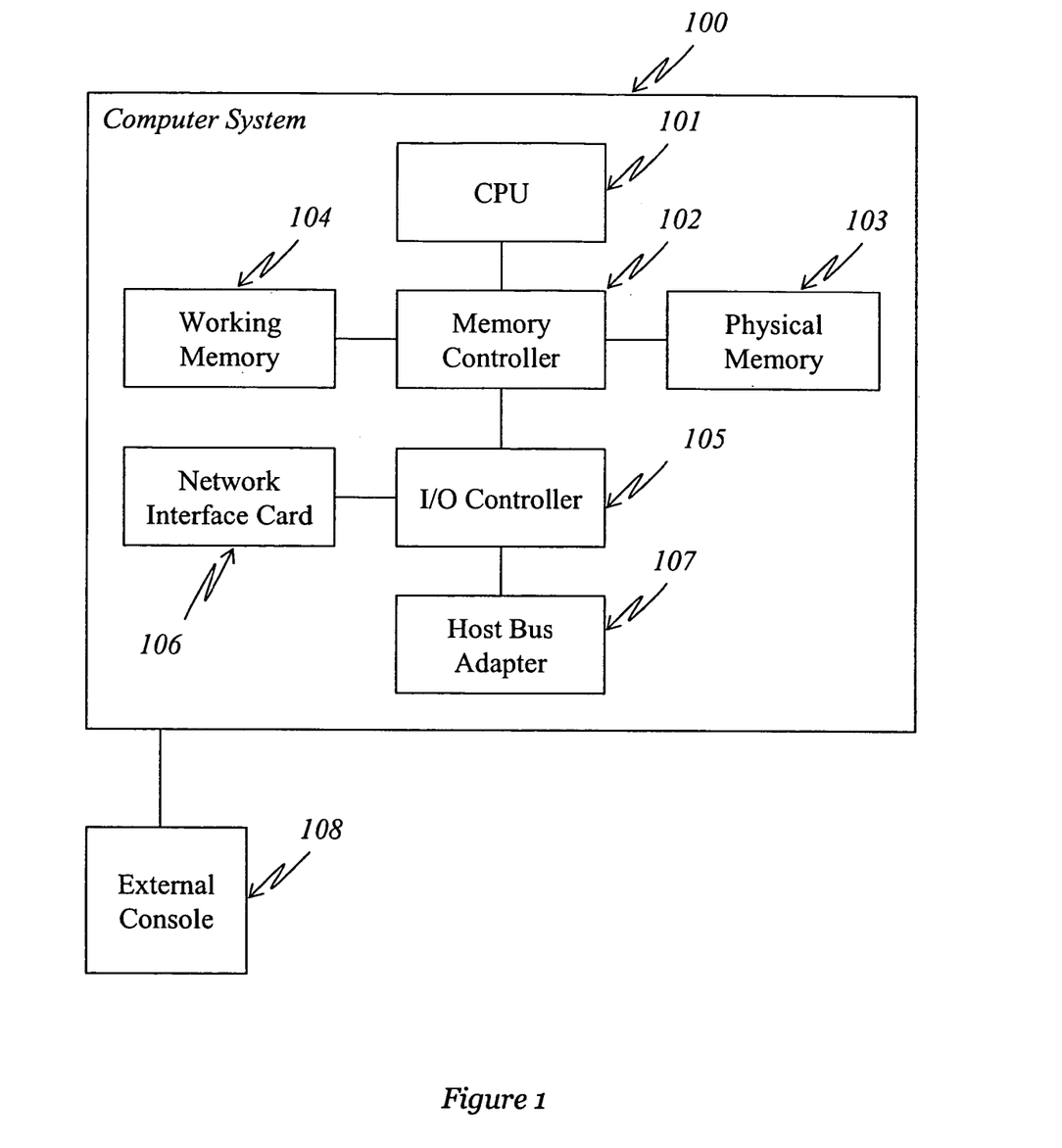
FIG. 1 is a block diagram of the computer system, including a memory controller as described herein.

FIG. 1 is a block diagram of a computer system 100, including conventional components of a CPU or processor 101, a physical memory 103, an input/output controller 105, a network interface card 106, and a host bus adapter 107. These are conventional well known components found in almost any computer and are not discussed further herein. In addition to these conventional components of a computer system, a system according to this invention includes a memory controller 102 and a working memory 104. It is appreciated that conventional computer systems have memory controllers and working memories; however, as will be discussed below, the memory controller 102 and the working memory 104 provide special features for the system of this invention. Accordingly, although conventional nomenclature is applied to these components, it will be apparent that they provide unique functionality. FIG. 1 also depicts an external console 108. Typically, this console is of a conventional design and is used by operators to access the computing system 100.

The memory controller 102 is a processor which virtualizes the physical memory 103. The processor 101, when it interacts with memory controller 102, in effect "sees" a virtual memory and accesses data in that memory by specifying an address within the virtual memory space. In the preferred embodiment of this invention, the CPU does not directly access the physical memory 103.

Preferably, the physical memory is divided into multiple memory extents, for example, as will be discussed in conjunction with FIG. 4. The processor 101 is allowed by memory controller 102 to access only a subset of these memory extents. Thus the memory controller provides functionality for mapping information between a virtual memory space as addressed by the processor 101 and the physical memory space in physical memory 103. For example, if the memory controller 102 receives a load/store request from the processor 101, it translates the address specified in the request to an address in the appropriate memory extent in physical memory 103.

A separate working memory 104 is also provided in the preferred embodiment shown in FIG. 1. Working memory 104 is used by the memory controller 102 to store and refer to memory maps, queues, management tables, and the like. These are all explained below. It should be appreciated that while physical memory 103 and working memory 104 are described herein as each consisting of a single memory, in reality each memory can be divided into an arbitrary number or independently addressable regions provided as individual circuit boards or chips, and not all of which need be of the same type, e.g. SRAM, DRAM, etc. Typically not every one of these memories will be accessible to any given component in FIG. 1.

Figure 2:
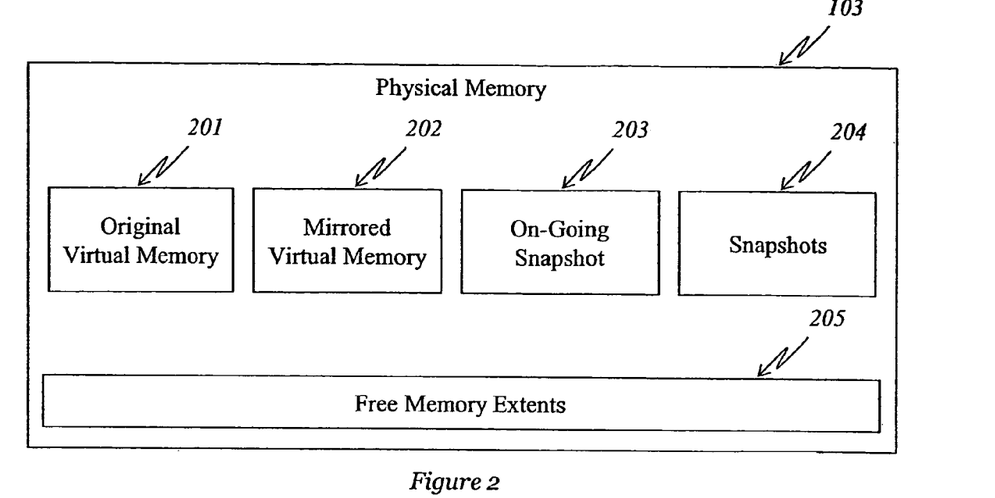
FIG. 2 is a diagram of the physical memory.

FIG. 2 is a diagram illustrating typical information stored in physical memory 103. As shown by the diagram, five logical types of information will usually be stored in the physical memory 103 as managed by memory controller 102. These types are original virtual memory 201, mirrored virtual memory 202, ongoing snapshot memory 203, previous snapshots 204, and free memory 205. The original virtual memory 201 is terminology used to describe the memory from which the CPU 101 is executing programs. Typically, this portion of the memory stores instructions, data, intermediate results, and final results. The CPU 101 stores data into this region via the memory controller, and executes its operations from it. Generally, viewed from the perspective of the processor 101, this region of physical memory provides the functionality of conventional memory in a computing system. As will be discussed below, however, this region of memory is used in various other operations unrelated to its use by the processor.

The mirrored virtual memory 202 is provided by a region of the physical memory 103. This region is used for storage of a mirrored copy of the original virtual memory 201. As original virtual memory 201 is changed by the processor's writes to it, those changes are mirrored into memory region 202 of physical memory 103. This is preferably performed in an asynchronous manner. For example, when the memory controller 102 receives a request to store data, it stores the data in the original virtual memory 201, but then creates a copy request to copy that data from the memory 201 to the mirrored memory 202. Then the memory controller continues operations as requested by the CPU 103. As soon as the CPU's request to write data into the mirrored memory 202 is received, a completion notification is sent back to the CPU 101. The memory controller 102 then queues the copy request for execution at a time when the CPU is not as busy. When it carries out the copy request, the CPU copies data from the original virtual memory to the mirrored virtual memory. By performing the mirroring in an asynchronous manner as described, the CPU does not need to wait for copying of data, and the performance impact on the CPU 101 is minimized. Of course, if desired a separate processor can be employed to handle the mirroring operations in lieu of CPU 101, for example by snooping the bus between the processor and the memory controller.

A snapshot is a point-in-time copy of a region of the original memory 201. Physical memory 103 preferably includes regions 203 and 204 for storing snapshots representing the state of memory 201 at an earlier time. Each snapshot is typically identified by an identification code or number which is unique. For example, a time stamp can be used to identify individual snapshots. The CPU 101 is not permitted to access the snapshots without specifying a snapshot ID. In this manner assurance is provided that old data, such as contained in the snapshots, is not used other than to determine the state of the machine at an earlier time, to restore the machine operation to its condition at that earlier time, to diagnose software or hardware problems, etc.

When the CPU 101 or the external console 108 issues a snapshot request to the memory controller 102, the memory controller starts creating an ongoing snapshot 203 by stopping copying of data from the original memory 201 to the mirrored memory 202. Because there may be data copy requests that have not yet been executed by the memory controller, the temporary halt in operation of the mirroring process results in an ongoing snapshot. This means that the memory controller 102 is still required to copy data from the original virtual memory to the ongoing snapshot.

The free memory extent 205, also shown in FIG. 2, is used to describe the provision of unused memory within physical memory 103. As additional snapshots are taken, or further mirroring performed, the amount of free memory 205 will decrease.

Figure 3:
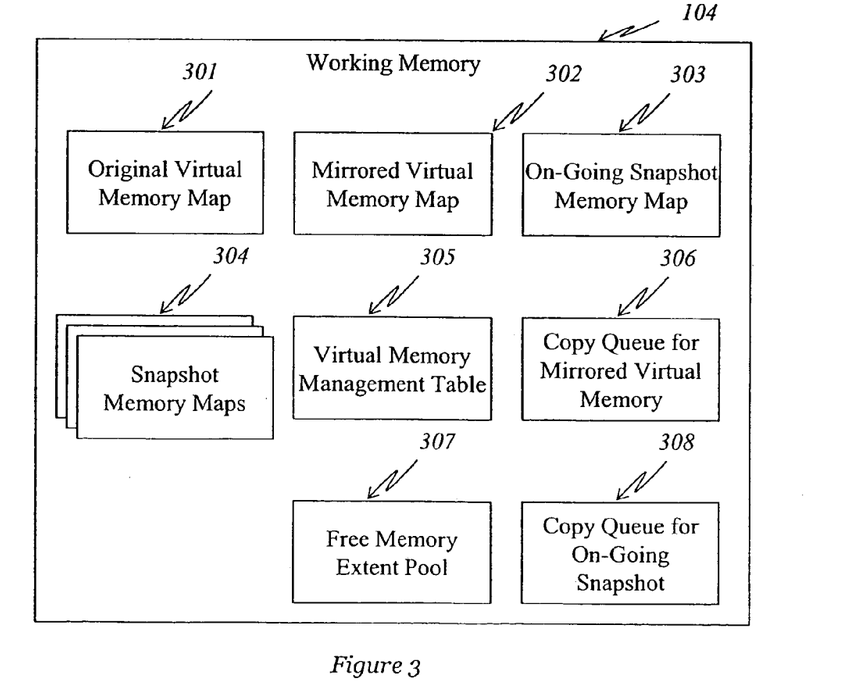
FIG. 3 is a diagram of the working memory associated with the memory controller.

FIG. 3 is an expanded block diagram of the working memory 104, which was shown as a single block in FIG. 1. The memory controller 102 uses the working memory 104 for storing and accessing management information required for managing the various memories, snapshots, etc. The different types of information contained within the working memory are shown as blocks 301-308 in FIG. 3. Each of these blocks is described next below. The manner in which they are maintained and used to control system operations is described later.

Memory controller 102 maintains within working memory 104 various virtual memory maps 301, 302, 303 and 304. These maps determine the relationships between the virtual memory and the physical memory. They also provide additional information as will be explained.

Figure 4:
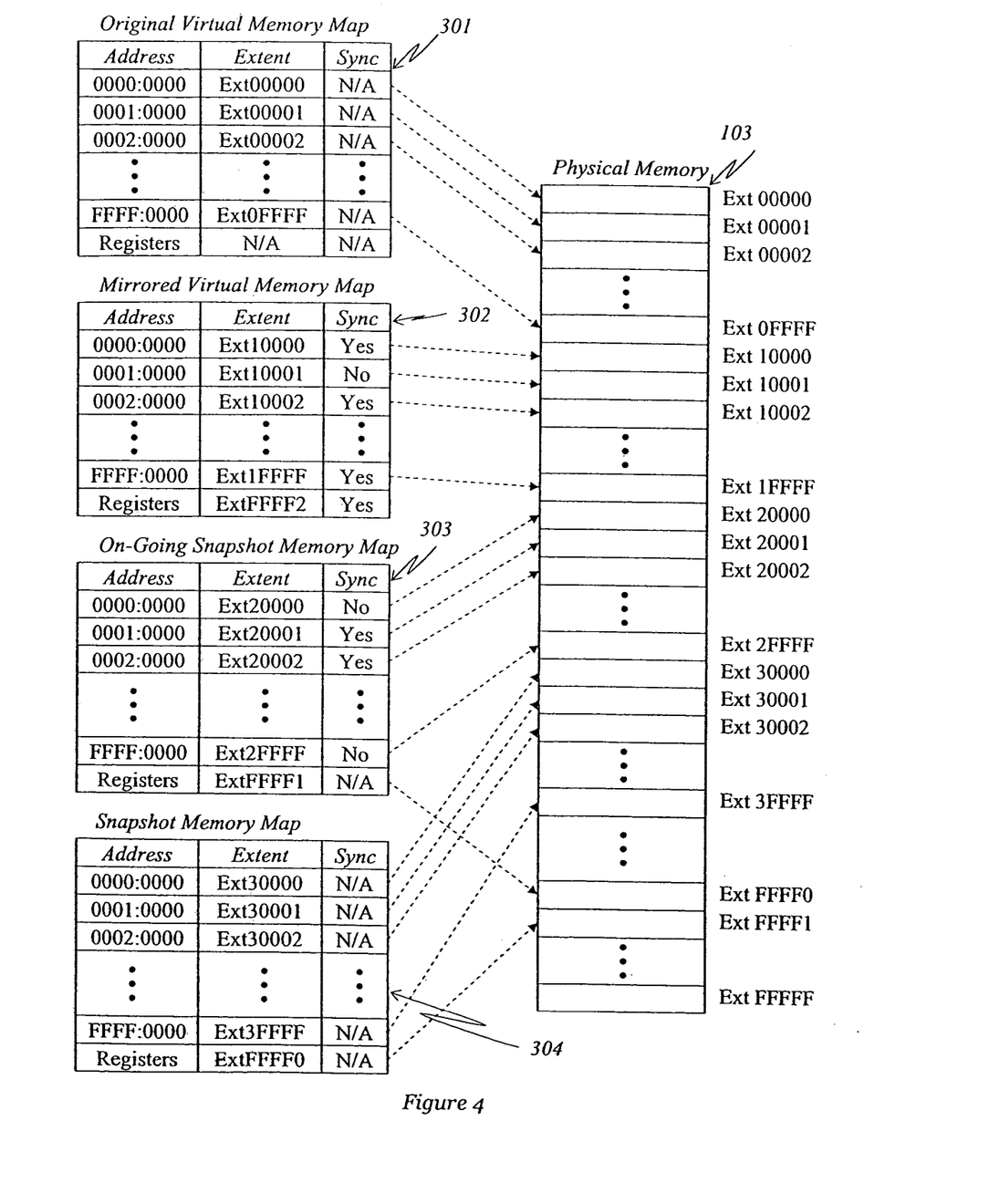
FIG. 4 is a diagram illustrating relationships between memory maps and the physical memory.

Each of the virtual memory maps can be considered as an array in which rows represent address ranges and columns (or fields) designate "Address," "Extent," and "Synchronized." (See FIG. 4.) The memory address space for each working memories is divided into multiple segments or regions. Each segment is mapped to a corresponding physical memory extent. The size of the segment and the size of the memory extent are usually the same. As shown by FIG. 4, the address column contains addresses for the memory space. The extent column stores physical memory extent numbers, while the sync column indicates whether the memory controller needs to copy data from the original virtual memory to the corresponding memory extent.

The sync column includes values of "yes," "no," and "not applicable (N/A)." A "yes" indicates that there is no need to copy data for a corresponding memory extent, i.e., the data has already been synchronized (copied). A "no" indicates that there is a data copy request related to the corresponding memory extent in the data copy queue, but that request has not been executed yet. The "not applicable" designation is used to show that the system or operator has determined that there is no need to make a copy of the data. The virtual memory maps of FIG. 4 each also include a special entry: "Registers." (See the last row of each of blocks 301, 302. 303 and 304.) This entry provides a memory extent in which all of the values in the CPU registers may be stored. These values may be stored whenever a snapshot is created, or at such other time as chosen by the external console 102.

FIG. 4 provides a more detailed view of the columns for the original virtual map 301, the mirrored virtual memory map 302, and the ongoing snapshot memory map 303, and the snapshot memory map 304. Note that the initial address in each of these tables corresponds to the physical memory address 103 where that data may be found. As may be expected, the memory maps may map information in any desired manner. The addresses do not need to be consecutive, as shown near the lower portion of FIG. 4. Information from one memory map may be located in physical memory 103 in any arbitrary location.

Figure 5:
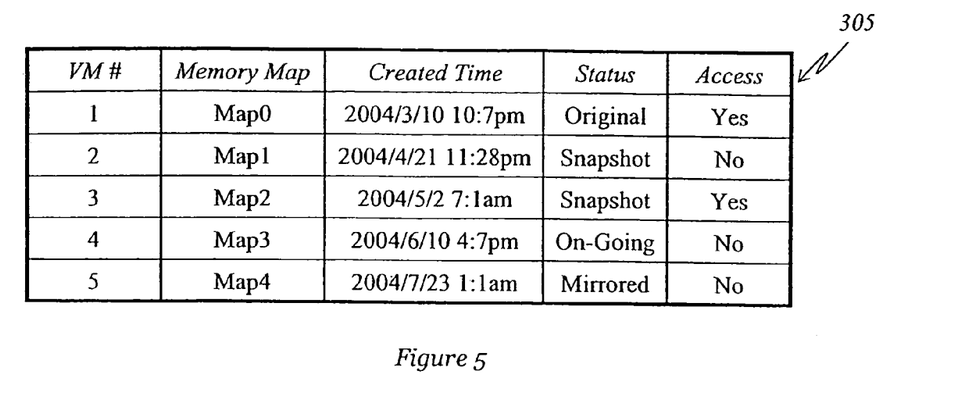
FIG. 5 is a diagram illustrating a virtual volume management table.

Next the details of each table are discussed. The virtual memory management table 305 is shown in more detail in FIG. 5. The original virtual memory 201, the mirrored virtual memory 202, the ongoing snapshot 203, and the snapshots 204 are all virtual memories referenced by the management table 305. Each virtual memory has an identification number (VM#) in FIG. 5, and an associated virtual memory map (Memory Map). The memory controller 102 creates and manages the management table 305. When the computing system is first turned on, the memory controller 102 establishes the original virtual memory and the mirrored virtual memory, and adds entries for them in the management table 305. This is shown by row 1 and row 5. If, and when, a snapshot is created, the memory controller 102 creates a new table entry for that, and updates table 305 accordingly. For example, as shown in rows 2 and 3, two snapshots have been taken at the time noted in the "created time" column. Each virtual memory in the memory management table 305 also includes an entry indicative of its status. If the status is "original," that indicates that the corresponding entry in the table is being used as the original virtual memory for the processor, as described above. In a similar manner, "mirrored" indicates a mirrored virtual memory, i.e. the memory that is receiving a copy of the original memory, while "ongoing" indicates a memory being used for an in-progress snapshot. "Snapshot" indicates a completed snapshot, i.e. a picture of the contents of the original virtual memory at some earlier time. The column designated "Access" is used to control access to the corresponding virtual memory by the processor.

Another item of information stored in working memory 104, as shown at a high level in FIG. 3, is the copy queue 306. The copy queue is a queue (list) to which data copy requests are provided. The mirrored virtual memory 202 and the ongoing snapshot memory 203 each have a copy queue 306, 308, respectively. These queues holds these requests to designate which copy request is to be performed next. The processor executes that copy request, then removes it from the queue. A typical data copy request will include a source and destination, and typically copies at least one extent of the memory.

Figure 6:
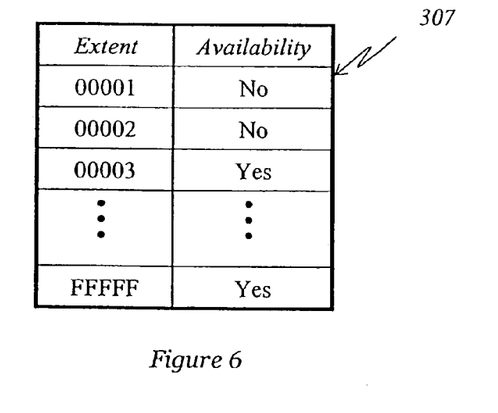
FIG. 6 is a diagram illustrating the free memory extent pool.

FIG. 3 also shows that the working memory 104 contains a free memory extent pool 307. This management table for the free memory extent pool 307 is shown in more detail in FIG. 6. The free memory extent pool 307, for each extent of the memory, indicates the availability or unavailability of that region of memory. A typical example is shown in FIG. 6. Once the computer is booted, the memory extents are allocated for the original virtual memory and the mirrored virtual memory, with all of the remaining memory extents pooled to provide the free memory extent pool 205. In the example shown in FIG. 6 extents 00001 and 00001 are indicated as not available, while all other extents are indicated as being available.

Figure 7:
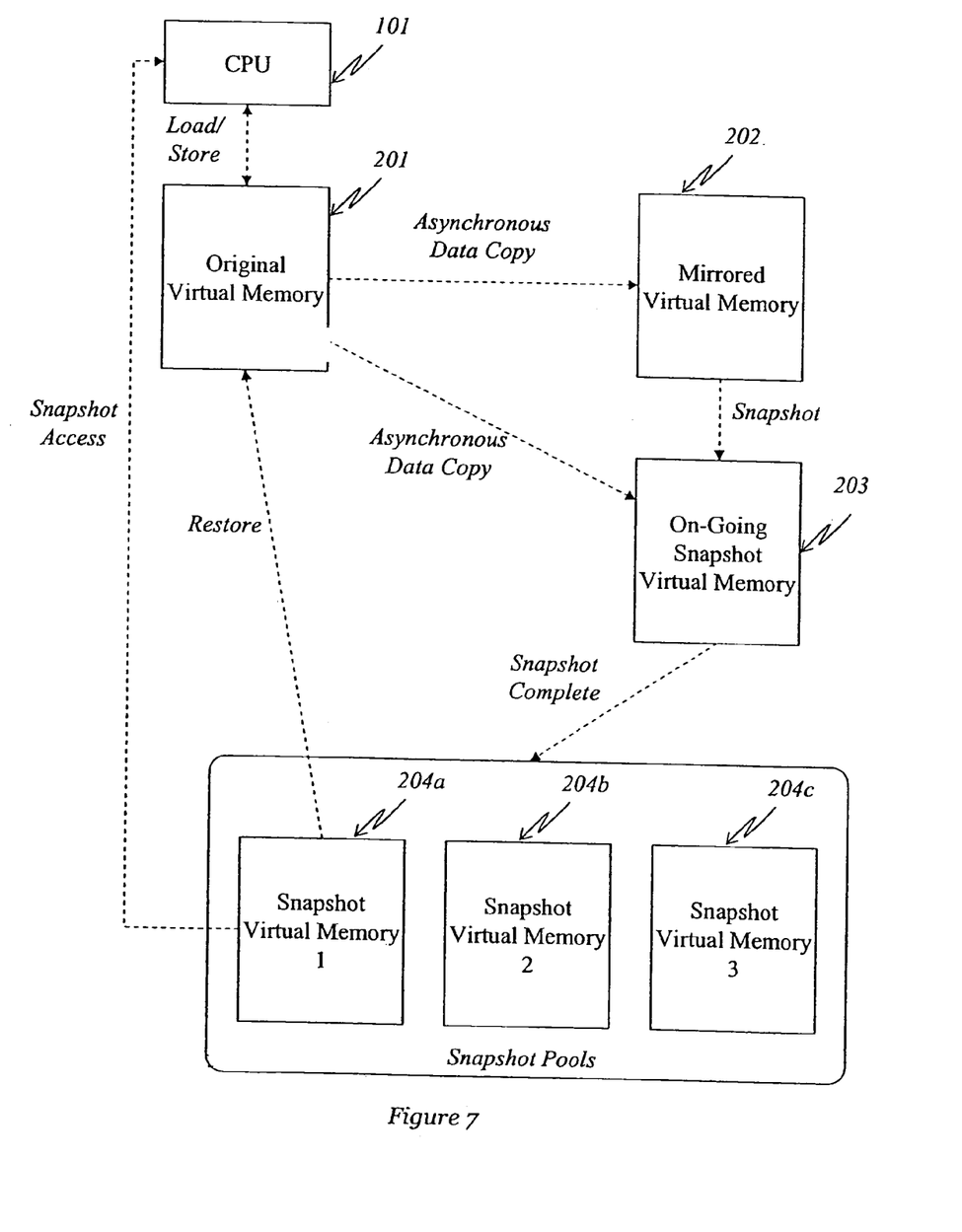
FIG. 7 is a flowchart illustrating memory controller operations.

FIG. 7 is a diagram which illustrates the overall relationships among the various types of memory discussed with respect to FIG. 2, and the management of each such memory extent as discussed in conjunction with FIG. 3. In operation, the CPU or processor 101 stores data in its internal registers and to the original virtual memory 201, and also loads data from virtual memory 201 back into internal registers within the processor 101. These operations are designated by the double headed load/store arrow in FIG. 7.

Data in the original memory 201 is mirrored to the mirrored virtual memory 202 in an asynchronous manner, as discussed above. This is reflected by the arrow designated asynchronous data copy. Because this is preferably an asynchronous operation, the original virtual memory and the mirrored virtual memory may not be identical at any given time, particularly when the original memory is subject to intensive use by the processor. The mirrored virtual memory map 302 (see FIG. 4) shows which segments in the mirrored virtual memory have been updated, and which segments have not been updated. The copy queue for the mirrored virtual memory, as mentioned above, tracks which memory extents remain to be copied from the original to the mirrored memory.

When the memory controller 102 receives a snapshot request from the processor 101 or from the external console 108, the memory controller creates a new virtual memory as necessary. The status of the mirrored virtual memory then changes from "mirrored" to "ongoing." The status of the new virtual memory is then set to "mirrored." Finally, the data copy requests for the new mirrored virtual memory are created so that all of the data in the original virtual memory is copied to the new mirrored virtual memory, as indicated by FIG. 7.

The memory controller 102 processes copy requests in the copy queue for the mirrored virtual memory and in the copy queue for any ongoing snapshots 203. Thus, eventually all of the "sync" entries in the snapshot memory map become "yes." After that, the status of the ongoing snapshot is changed to "snapshot" as reflected by FIG. 2. In other words, the snapshot is completed.

In FIG. 7, if the CPU 101 needs to recover data from a snapshot, it is permitted to access the snapshots 204, to load data from them and store that data in its internal registers or elsewhere. To perform this operation, the processor, however, needs to specify a virtual memory identification in its request. When the memory controller 102 receives a request for restoration from the CPU or from the external console, the memory controller changes the status of the specified virtual memory from "snapshot" to "original" and changes the status of the original virtual memory from "original" to "snapshot." During this process the CPU is stopped, and program code is not executed. Then the desired snapshot is retrieved and used for further processor operations, in effect restoring the processor to its state at an earlier time. Of course, undesired older snapshots may be deleted and associated management information cleared from the various management tables if the processor so requests. When such occurs, then the memory allocated for those snapshots is returned to the free memory pool.

Figure 8:
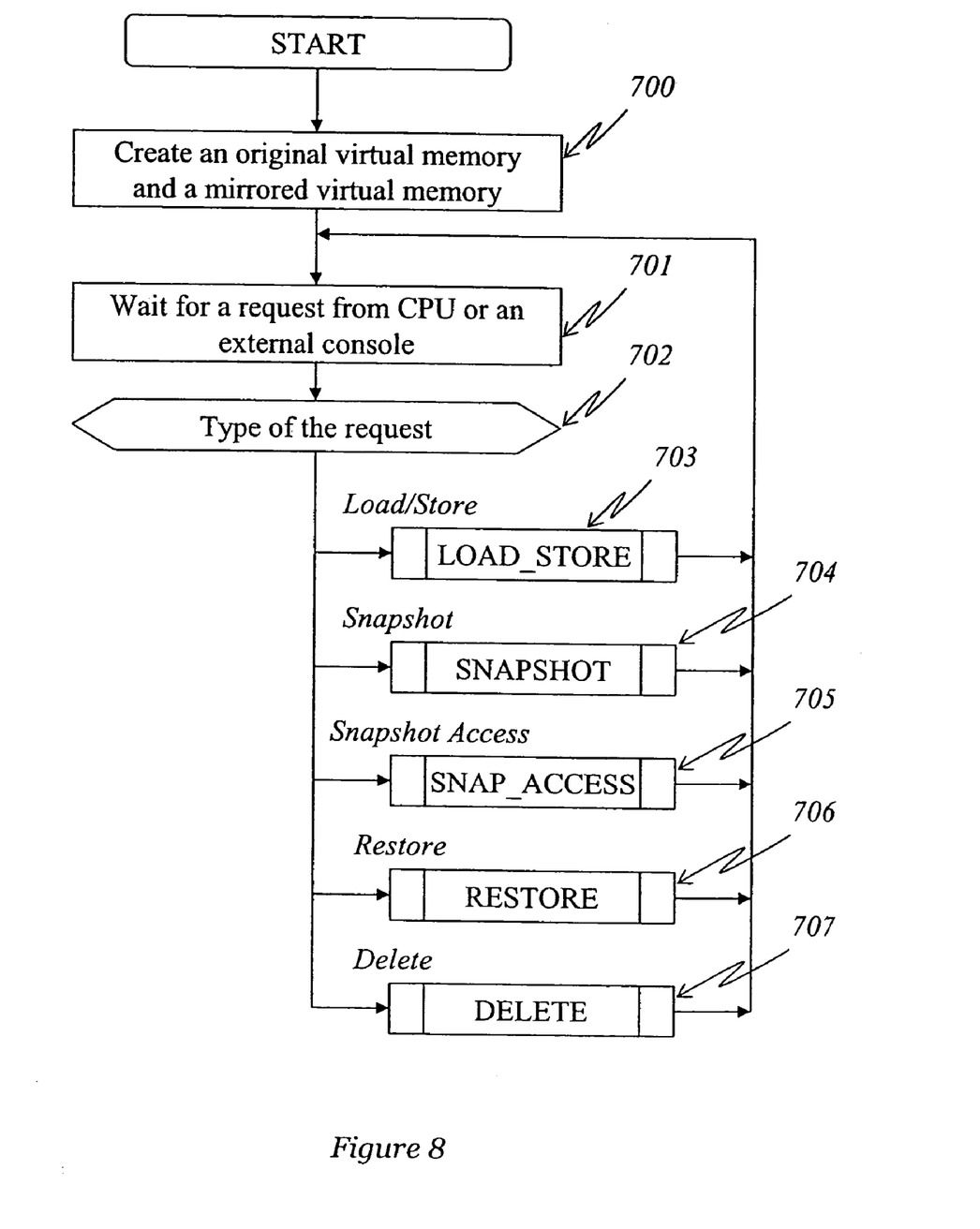
FIG. 8 is a flowchart illustrating overall system operations.

FIG. 8 is a flowchart illustrating operations of the memory controller 102. When the computer is booted, the memory controller operations begin. At step 700 the memory controller creates an original virtual memory and a mirrored virtual memory by reserving space in the physical memory. After that, processor operations begin, and the processor loads bootstrap code into the original virtual memory. At step 701 the memory controller waits for a request from the CPU or from the external console. Depending upon the type of request, the memory controller then performs an appropriate operation. (Of course, the processor may operate independently of the memory controller for periods of time when its operations do not require use of the memory.) The five types of operations depicted in FIG. 8 are: load/store, snapshot, snapshot access, restore, and delete. These are designated with blocks 703–707, respectively. The particular operations carried out by each of these blocks are shown in later figures and discussed below. Once the appropriate operation has been invoked and completed, then control returns back to the top of the diagram to wait for the next request from the CPU or request from the external console at step 701. This cycle of execution, use of the memory controller, and invocation of the desired subroutine, is repeated until the operations are complete. Next the functions performed by each of the subroutines shown in FIG. 8 in single block form are discussed.

Figure 9:
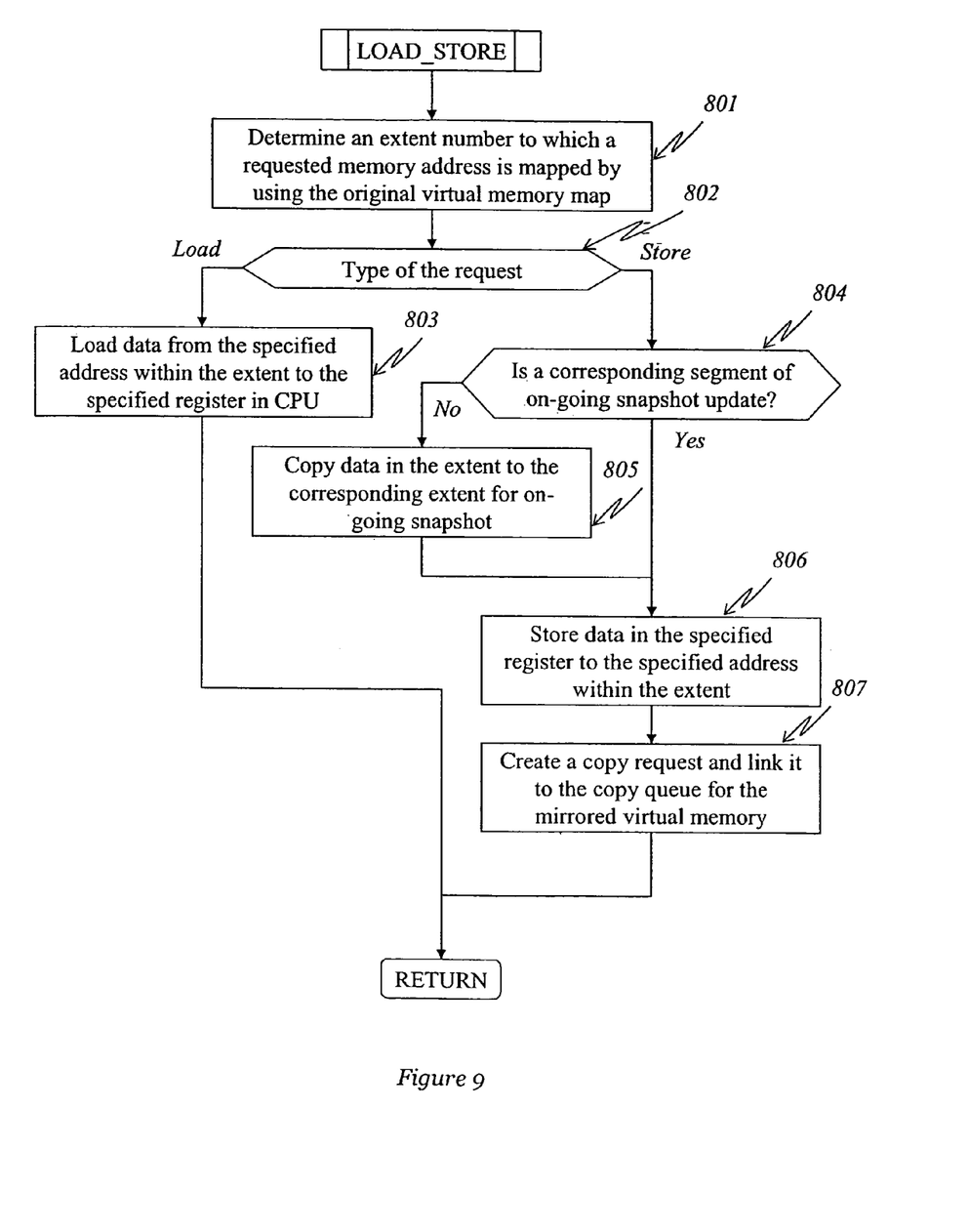
FIG. 9 is a flowchart illustrating the load-store subroutine.

FIG. 9 is a flowchart illustrating the load/store operation. Once this subroutine is invoked, flow transfers to step 801 to determine the memory extent number to which a requested memory address is mapped. This is performed by using the original virtual memory map discussed above in conjunction with map 301 in FIG. 3. The memory controller first determines the type of request, i.e., whether the operation is a load or a store. If the operation is a load, then the memory controller transfers control to step 803. At that step the memory controller loads data from the specified address within the extent of the CPU's register as specified in the request. After the load, the operation exits the subroutine as shown by "return" at the bottom of FIG. 9.

On the other hand, if the request at step 802 is a store operation, then the memory controller checks to determine if it needs to copy that data to the corresponding extent of an ongoing snapshot. This is determined by looking at the ongoing snapshot memory map 303. If the corresponding segment is not in an ongoing snapshot update, then, as shown by step 805, the data is copied to the corresponding extent for the ongoing snapshot. On the other hand, if it is a corresponding segment of the snapshot update, then as shown in step 806 the data is stored in the specified register to the specified address within the extent. In effect, at step 804 the memory controller is checking to determine if the memory controller needs to copy data from the determined extent to a corresponding extent of the ongoing snapshot by looking at the ongoing snapshot memory map. The memory controller then stores the data in the specified register at the specified address within the determined extent, as shown by step 806. Finally, as shown by step 807, the memory controller creates a data copy request and links it to a copy queue for the mirrored virtual memory. Upon completion of this step, the memory controller exits this subroutine.

Figure 10:
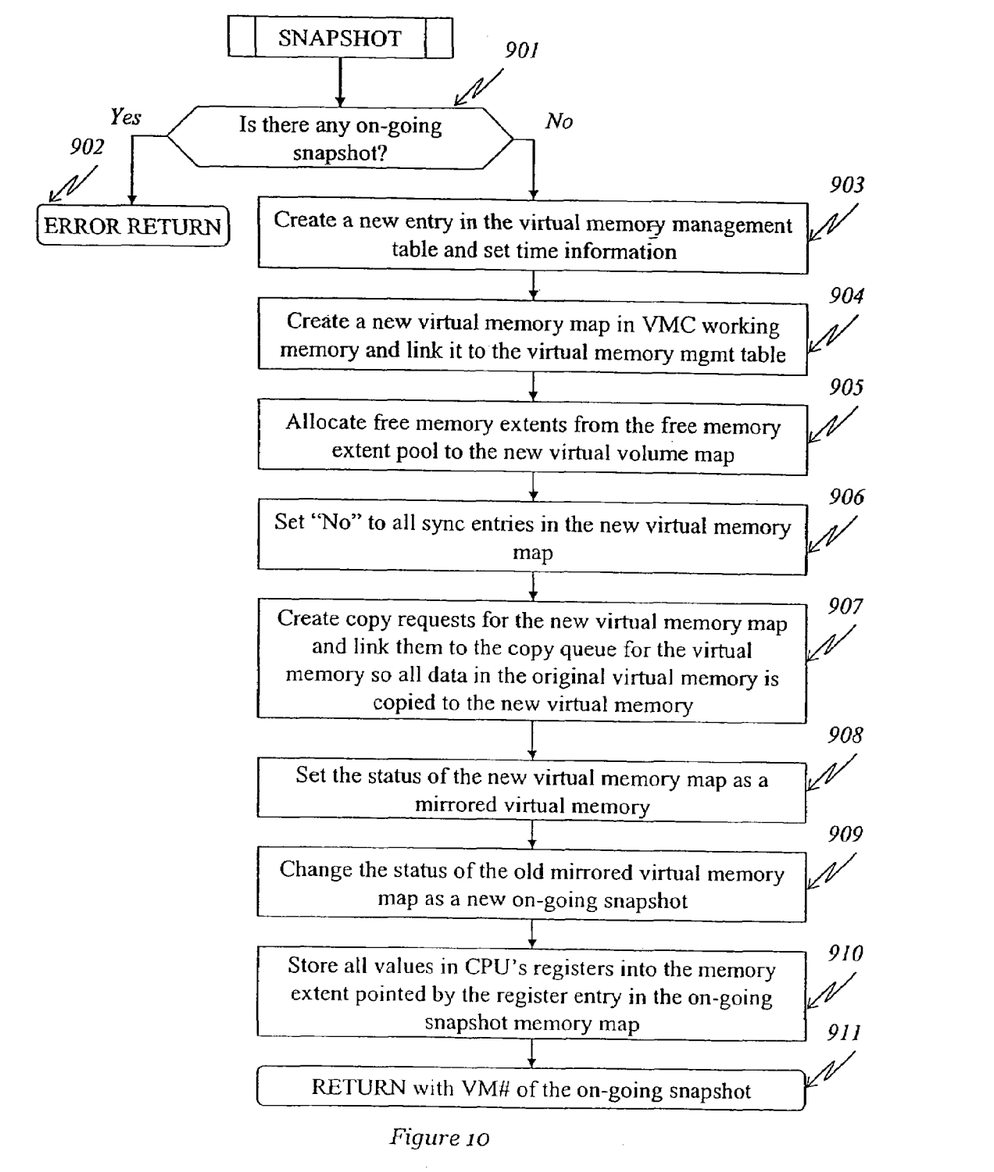
FIG. 10 is a flowchart illustrating the snapshot subroutine.

FIG. 10 is a flowchart illustrating the snapshot subroutine. During the taking of the snapshot, the processor is stopped. This assures that data in the original virtual memory is not changed during the time required to take the snapshot. Initially, a test is made at step 901 to determine whether there is an ongoing snapshot. If there is an on-going snapshot, then in this embodiment an error is returned. It should be noted, however, that it is technically possible to take multiple overlapping snapshots with the appropriate overhead imposed on the various memories involved to assure consistency.

Assuming there is not an ongoing snapshot, then at step 903 a new entry is created in the virtual memory management table. This allocates a unique memory ID for the new entry and sets time information in it. Typically, the memory controller will use the computer's clock time as the time to designate each snapshot.

At step 904 the memory controller creates a new virtual memory map in the working memory 104 and links that with the virtual memory management table 305 in the working memory 104. Next, at step 905, the memory controller reserves enough free memory from the free memory extent pool 205 in the physical memory 103 to allocate a new virtual memory map. The memory controller then changes the free memory extent pool 205 so that the allocated extents are now characterized as in use.

Next, at step 906, the memory controller sets "no" into all of the "sync" entries in the new virtual memory map. Following this operation, the memory controller creates copy requests for the new virtual memory, and links these requests to a copy queue for the virtual memory. In this manner all data stored in the original virtual memory may be copied to the new virtual memory. As shown by step 908, the new virtual memory is then set to "mirrored" status.

Next, as shown by step 909, the memory controller changes the status of the old mirrored virtual memory to "ongoing," and then, as shown in step 910, begins retrieving values from the CPU registers and storing them in the ongoing snapshot memory map. The process concludes at step 911 with a return of the virtual memory number to the requester and exiting from the subroutine.

Figure 11:
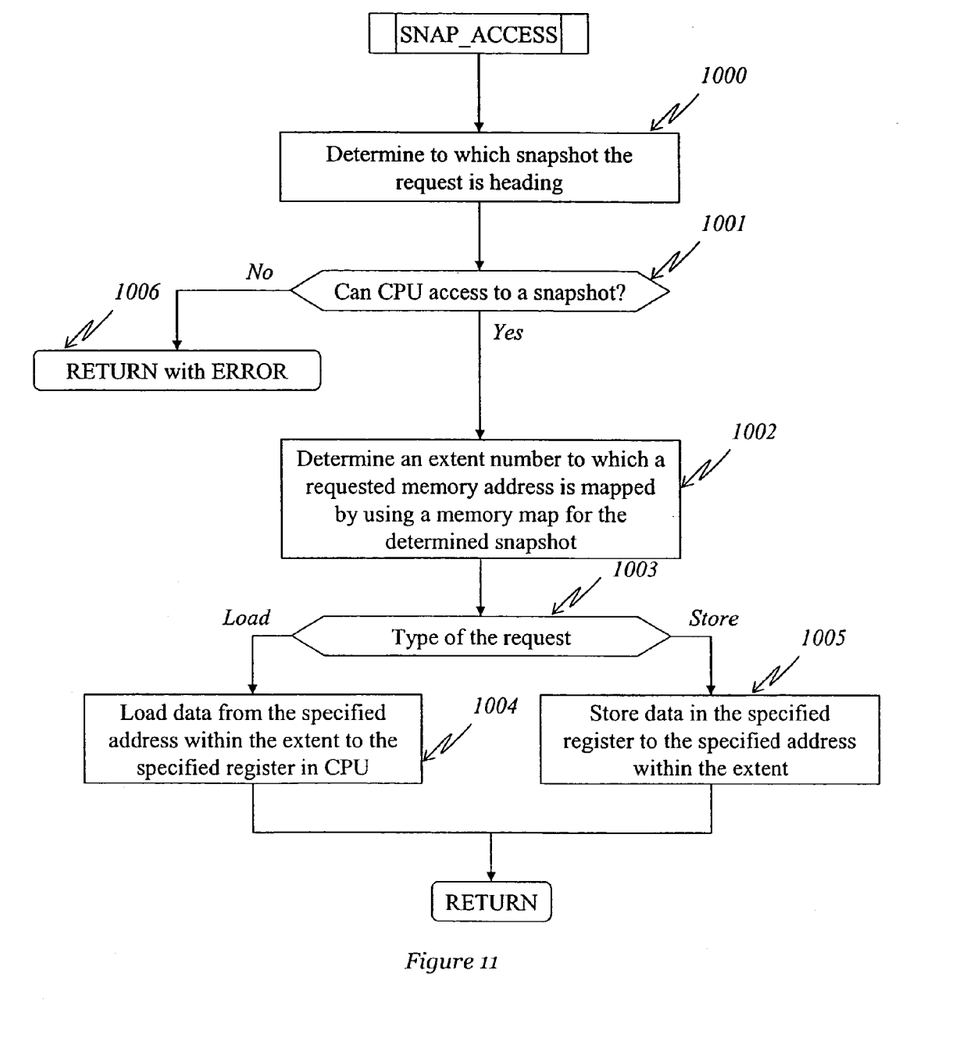
FIG. 11 is a flowchart illustrating the snapshot access subroutine.

FIG. 11 illustrates the snapshot access subroutine. As with the other subroutines discussed above, this subroutine is invoked by the procedures set forth in FIG. 8. The snapshot access routine allows the processor to retrieve the contents of a previously stored snapshot.

The first step 1000 shown in FIG. 11 is to determine to which snapshot the request is addressed. At step 1001 the CPU determines if it can access the snapshot specified by the request by consulting the virtual memory management table 305 in working memory 104. If it cannot access that snapshot, an error is returned, and the subroutine is terminated as shown by step 1006. If the CPU can access the snapshot, then the process moves to step 1002 where the memory controller determines the memory extent number to which the requested memory address is mapped by using the memory map of the addressed snapshot. At step 1003 the type of request is determined, and appropriate actions taken depending upon whether the request is for a load or a store. The load request 1004 loads data from the specified address to the specified register of the CPU and then exits. The store request stores data in the specified register and then exits the subroutine.

Figure 12:
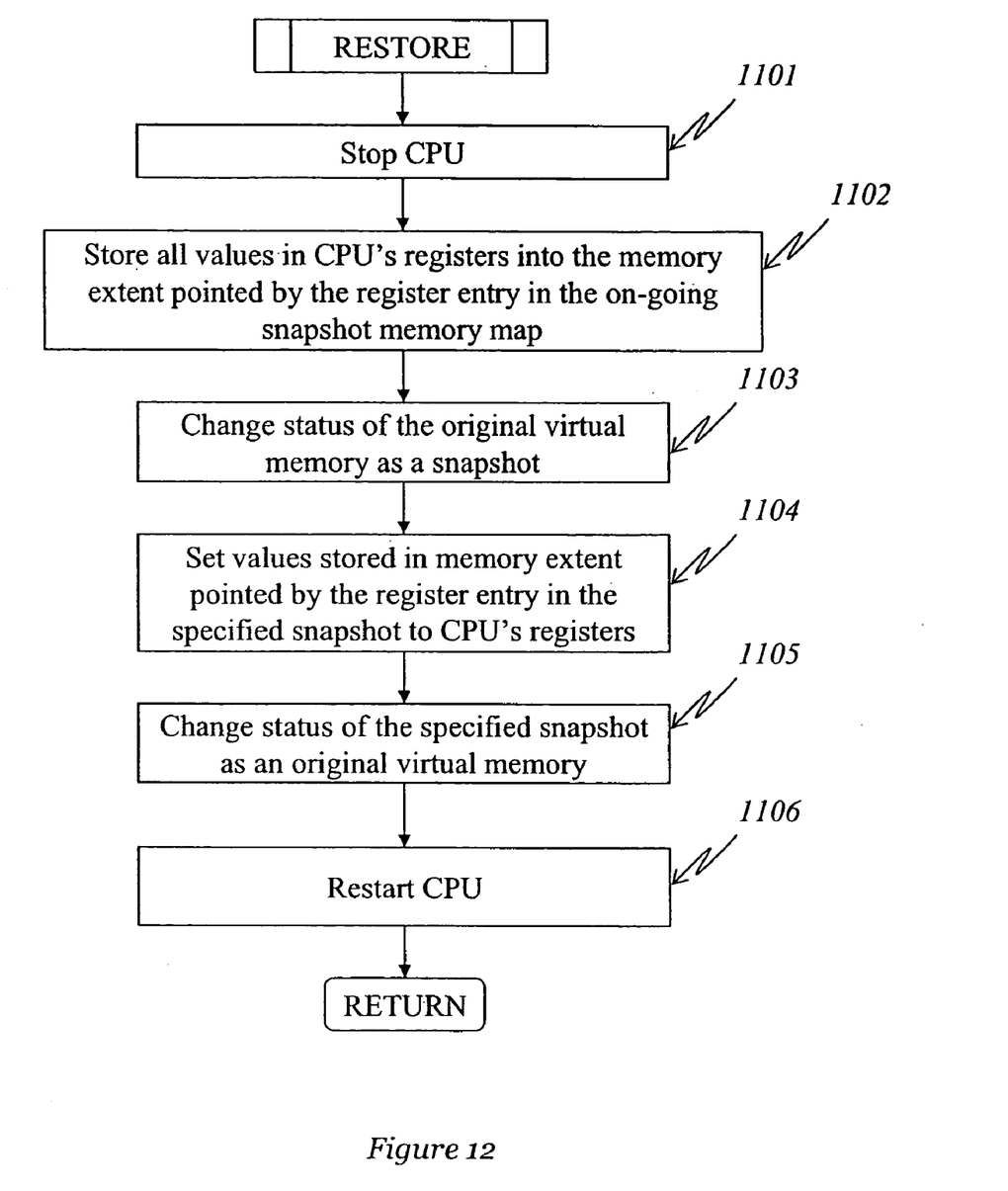
FIG. 12 is a flowchart illustrating the restore subroutine.

FIG. 12 is a flowchart illustrating the restore subroutine. During the restore process the CPU or processor 101 is stopped, as shown by step 1001. Next, as shown by step 1002, the memory controller stores all of the values in the CPU registers into the memory extent pointed to by the register entry in the original virtual memory map 301. At step 1103 the memory controller changes the status of the original virtual memory to "snapshot." It then sets the values stored in the memory extent pointed to by the register entry of the specified snapshot memory map. See step 1004. Next, the status of the specified snapshot is set to be original virtual memory at step 1105, and then the CPU is restarted at step 1006. Following this operation the subroutine returns.

Figure 13:
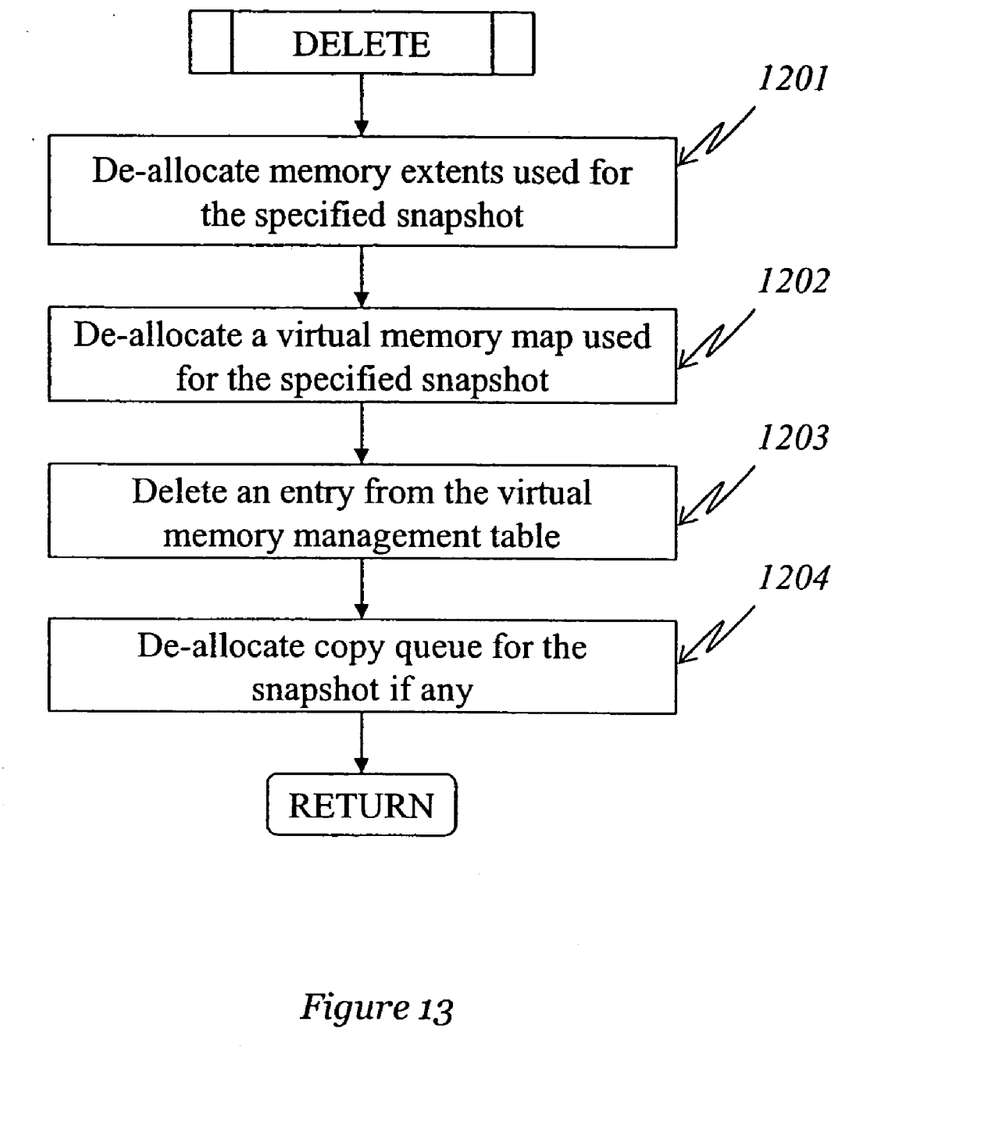
FIG. 13 is a flowchart illustrating the delete subroutine.

FIG. 13 is a flowchart illustrating the delete subroutine, also invoked from the flowchart of FIG. 8. The delete routine frees memory formerly used by snapshots which are no longer needed. As shown by FIG. 13, at step 1201, the memory extents for the specified snapshot are first deallocated. This step is followed by deallocating the virtual memory map used for the specified snapshot, as shown at step 1202. Then, as shown by step 1203, the appropriate entry is deleted from the virtual memory management table 305. Finally, if there are any copy operations in the copy queue for that snapshot, those are also deallocated or deleted, as shown at step 1204.

Figure 14:
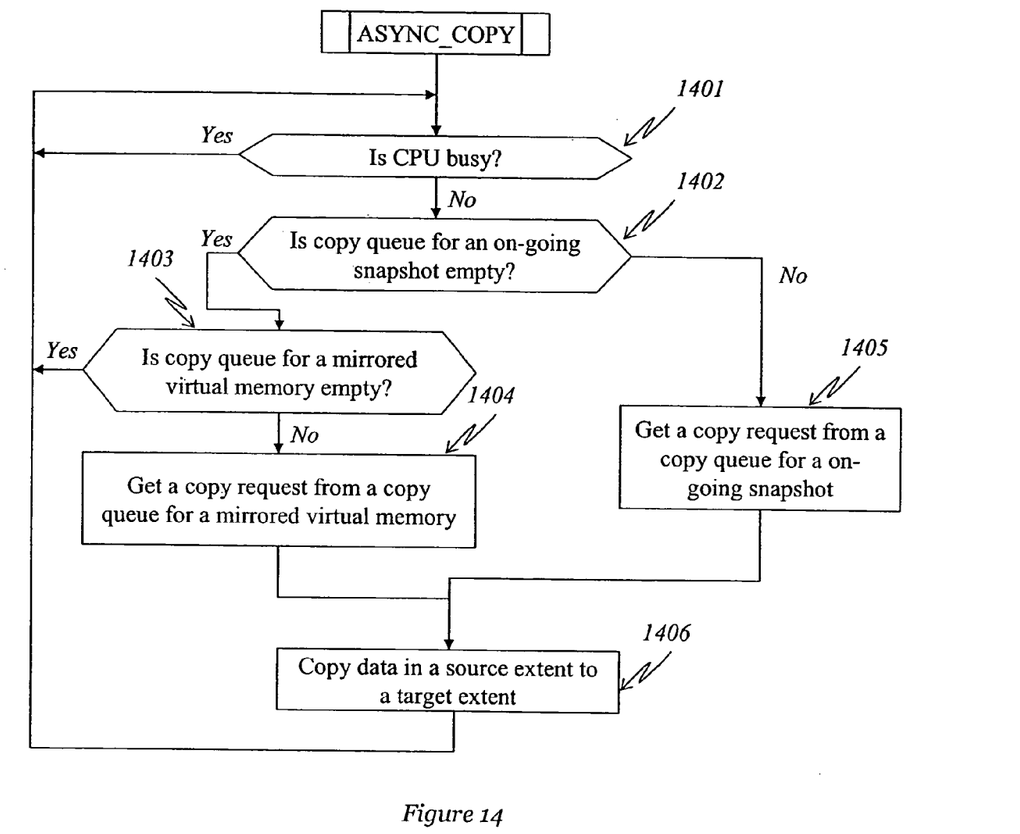
FIG. 14 is a flowchart illustrating asynchronous data copying.

FIG. 14 is a flowchart illustrating an asynchronous copy subroutine. This process is not invoked by the memory controller operations shown in FIG. 8, rather it is invoked independently, beginning when the computer is booted up. The asynchronous copy operation copies data between the memory extents, and operates independently from the main procedures described thus far. At step 1401 a determination is made of whether the processor or CPU is busy. If it is busy, the system cycles until the CPU is not busy. One way of determining whether the CPU is busy is to look at the duration of cache memory hits. If no program is running, or if programs are waiting for completion of input/output operations, no memory loads or stores will occur because those requests are being filled by the cache memory. Another way for this process to be invoked is to have it invoked upon direction by the CPU or an external console, such as console 108.

At step 1402 the memory controller determines whether the copy queue for any ongoing snapshot is empty. If it is, then control shifts to step 1403 where the memory controller determines if the copy queue for the mirrored virtual data memory is empty. If it is empty, it means there is no copy request, so the process reverts back to step 1401.

On the other hand, if the copy queue is not empty, then the memory controller retrieves the copy request from the copy queue as shown at step 1404. The system then moves to step 1406. At that step the data is copied from the source memory to the target memory.

The system can also reach the step by determining the copy queue for an ongoing snapshot is not empty. This is shown by the "no" branch from step 1402. In that case, the copy request is retrieved from the queue at step 1405, and then the data is copied at step 1406.

Figure 15:
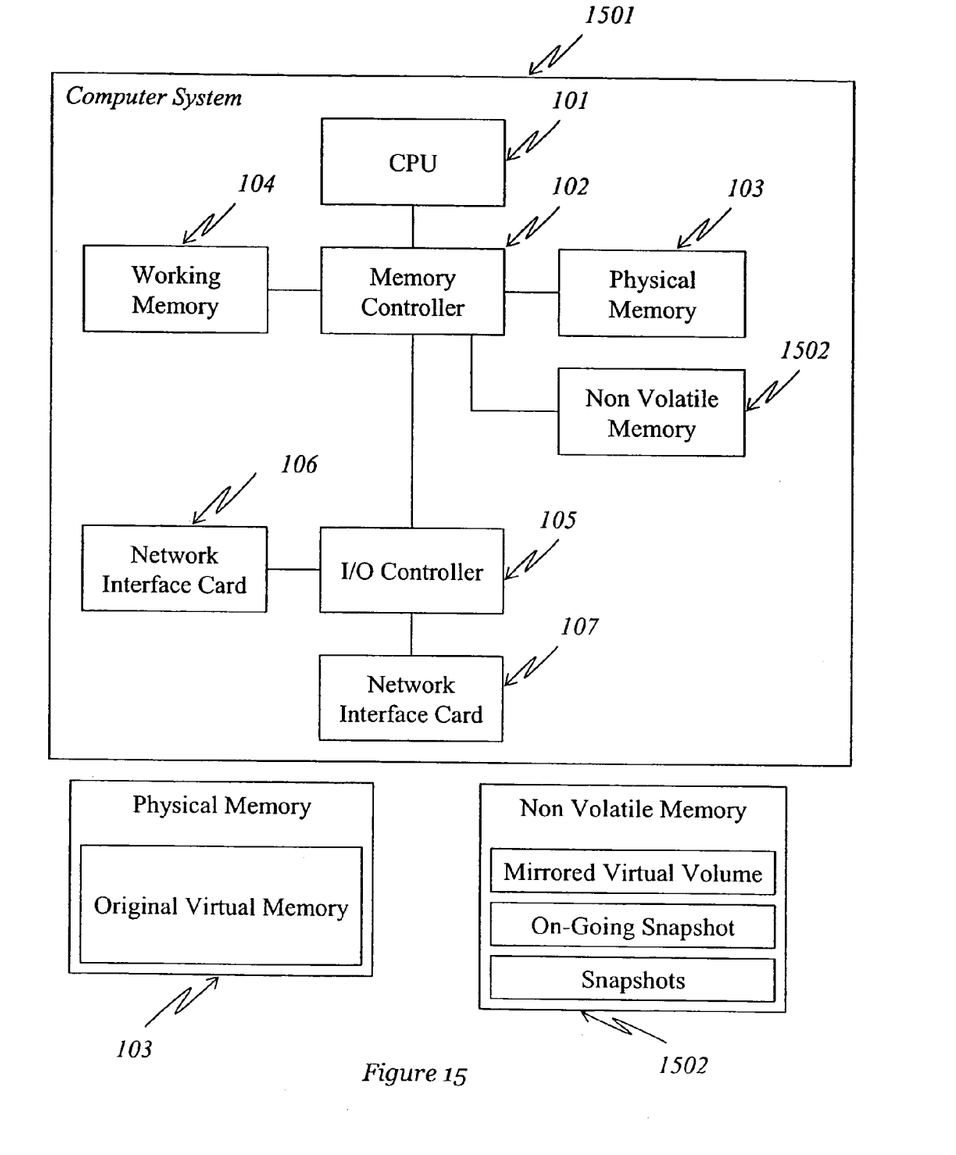
FIG. 15 is a block diagram of the computer system with a nonvolatile memory.

FIG. 15 is a block diagram illustrating a computer system in which multiple types of memories are employed with the memory controller 102. Thus it differs slightly from the embodiment of FIG. 1. In the example of FIG. 15, the computer system has two different memories, a physical memory 103 and a nonvolatile memory 1502. The nonvolatile memory, for example, can be a battery backed-up memory which retains data even if power fails. In the implementation of FIG. 15, the memory controller recognizes the characteristics of the various memories by using previously stored configuration information, or performing a memory-type checking operation when the computer is booted up.

In the implementation of FIG. 15, the memory controller manages the memory extents for both the physical memory 103 and the nonvolatile memory 1502 as different free memory extent pools. The memory controller allocates the memory extents of physical memory to the original virtual memory and the memory extents of the nonvolatile memory to mirrored virtual memory and snapshots. This assures that the mirrored data and/or the snapshot data will survive power failures or other unexpected occurrences. Diagrams illustrating the exemplary contents of the physical memory and the nonvolatile memory are shown in the lower portion of FIG. 15.

In a further embodiment of the invention, a computer system such as illustrated in FIG. 1 or 15 is coupled to a storage system, for example as provided by the assignee of this invention, which storage system also provides snapshot functionality. In such implementations a program or script running on the computer system can direct the memory controller to create a snapshot of the memory and instruct the storage system to create a snapshot of the data volumes. In this manner, both data in the computer system memory and data in the computer system storage will be protected consistently.

In the system depicted in FIG. 15, a network interface card 107 can be used to send snapshot data from the physical memory to remote computers or to the external storage system. This procedure protects snapshots from failure of the physical memory, failure of the memory controller, or failure of other components in the computer system. In addition, it enables the external computer to analyze data in the snapshot independently from the analysis being performed by this computer. Such an approach can be used to enhance data reliability, provide forms of parallel processing or similar functionality.

The foregoing has been a description of the preferred embodiments of a computer system providing mirroring and snapshot functionality for the computer system memory, and even registers in the processor itself. It will be appreciated that numerous variations may be made in the implementation of such a system. Accordingly, the scope of the invention is defined by the appended claims.

What is claimed is:

1. A computer system comprising:
   a processor;
   a memory controller coupled to the processor;
   a working memory, the working memory comprising a free extent memory pool, the free extent memory pool indicating the availability or unavailability of each memory extent; and
   a physical memory coupled to the memory controller, the physical memory divided into memory extents and including:
   a first region for use by the processor in executing instructions, and
   a second region not for use by the processor, wherein the memory controller causes the first region to be copied to the second region as the computer system operates to thereby provide a copy of the first region in the second region;

wherein the memory controller, at a first selected time, further causes a copy of the second region to be made to a third region of the physical memory to thereby provide a snapshot of the first region at that selected time; and wherein the status of the regions may be selected from the group consisting of original, mirrored, ongoing, and snapshot.

2. A computer system as in claim 1 wherein the memory controller manages a mapping table to record relationships between the first region and the second region.

3. A computer system as in claim 2 wherein the memory controller manages the mapping table to record relationships between the second region and the third region.

4. A computer system as in claim 1 wherein at a second time after the first time the memory controller further causes another copy of the second region to be made, and both copies of the second region are present in the physical memory contemporaneously.

5. A computer system as in claim 4 wherein each copy of the second region is associated with a time stamp indicating when that copy was made.

6. A computer system as in claim 1 wherein copying of the first region to the second region is performed asynchronously with respect to changes in the first region.

7. A computer system as in claim 6 wherein a copy queue is used to track changes made to the first region and later effect those changes to the second region.

8. A computer system as in claim 1 wherein the processor includes registers having information therein, and the memory controller also causes copying of the information from the registers to the physical memory.

9. A computer system as in claim 1 further comprising a storage system coupled to the processor, and wherein the memory controller causes the storage system to take a snapshot of data stored in the physical memory and save the snapshot in the storage system.

10. A computer system as in claim 1 further including a working memory coupled to the memory controller, the working memory for storing information relating to operations of the memory controller and the physical memory.

11. The computer system as in claim 1 wherein the system further comprises nonvolatile memory, the memory controller managing memory extents for the physical memory and the nonvolatile memory as different free memory extent pools.

12. The computer system as in claim 1
wherein the memory controller, at a first selected time, further causes a copy of the second region to be made to a third region of the physical memory to thereby provide a snapshot of the first region at that selected time, and wherein the memory extents of the physical memory are allocated to the first region and the memory extents of the nonvolatile memory are allocated to the second and third regions.

13. The computer system as in claim 1 wherein the status of the second region is changed from mirrored to ongoing after a copy of the second region is made to a third region of the physical memory to provide a snapshot of the first region at that selected time.

14. The computer system as in claim 1 wherein the status of the first region is changed to snapshot and the third region is used by the processor in executing instructions.

15. The computer system as in claim 1 wherein access to the snapshot is controlled by the processor, a region identification being specified by the processor within a load request for the snapshot.

16. A method of improving reliability of a computer system having a processor, a memory controller coupled to the processor, and a physical memory having at least a first region for storing information and a second regions for storing information, the physical memory being coupled to the memory controller, wherein the physical memory also includes a third region, the method comprising:

using the first region of the physical memory for processor operations;

at a selected time, copying the information stored in the first region to the second region wherein copying of the first region to the second region is performed asynchronously with respect to changes in the first region;

continuing processor operations using the first region;

at a time after the selected time, copying the information from the second region to the third region; and performing a restore process where the third region is used for processor operations and the first region is preserved as a snapshot.

17. A method as in claim 16 further comprising:

providing a working memory having a mapping table stored therein; and using the memory controller to manage the mapping table to record relationships between the first region and the second region.

18. A method as in claim 17 further comprising:

providing a third region in the physical memory for storing periodic images of the second region; and using the memory controller to manage the mapping table to record relationships between the second region and the third region.

19. A method as in claim 16 wherein at a time after the selected time the memory controller further causes another copy of the second region to be stored in the physical memory, and both copies of the second region are present in the physical memory contemporaneously.

20. A method as in claim 19 further comprising applying a time stamp to each copy of the first region stored in the second region indicating when that copy was made.

21. A method as in claim 16 further comprising a step of tracking changes made to the first region and later effecting those changes to the second region.

22. A method as in claim 16 further comprising copying of information from registers in the processor to the physical memory.

23. A method as in claim 16 further comprising storing a copy of the first region in a storage system coupled to the processor.

* * * * *